Oct. 4, 1960 J. V. RICHGRUBER 2,954,698
PORTABLE LIQUID SAMPLER AND FLOW RECORDER
Filed May 22, 1957 4 Sheets-Sheet 4
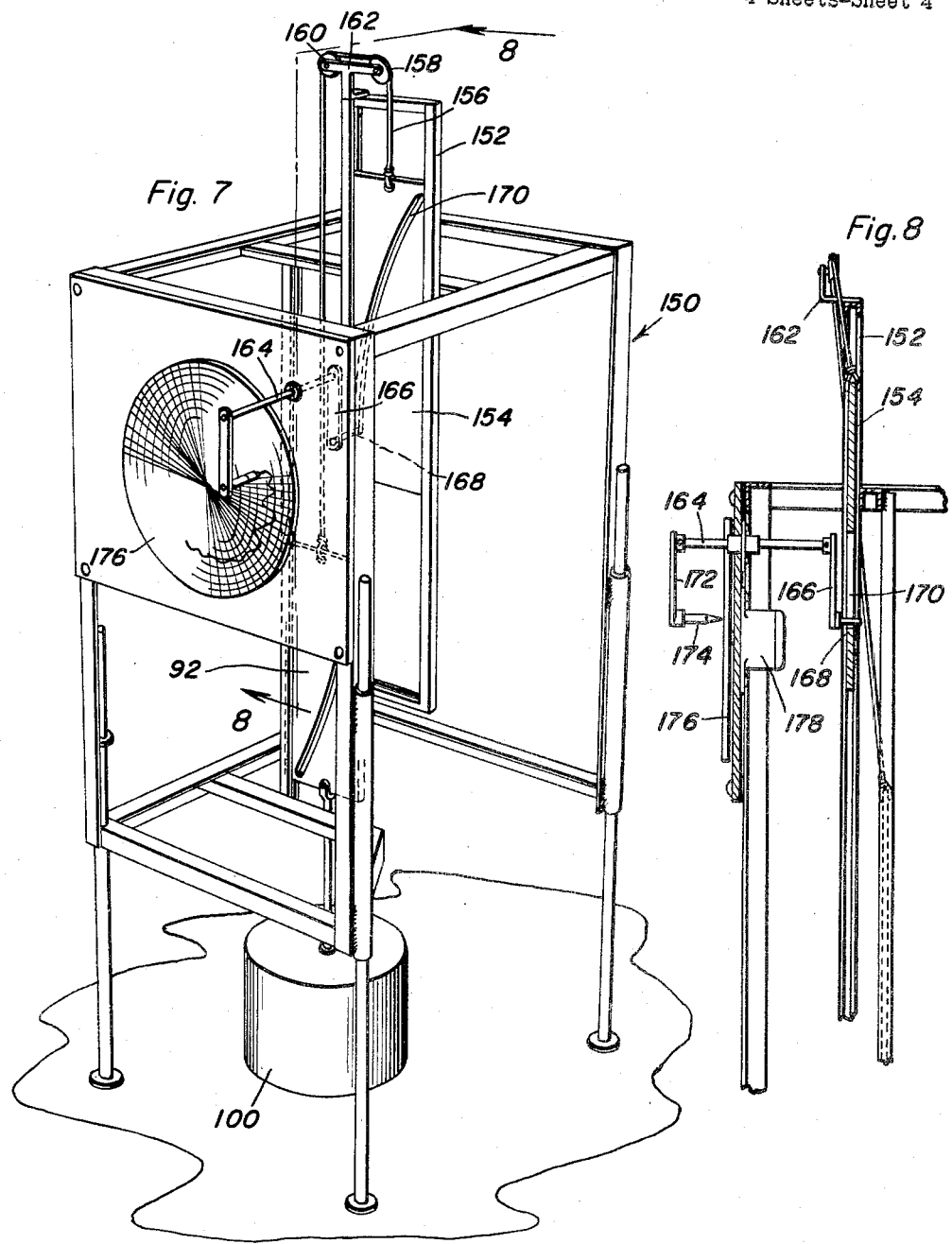
James V. Richgruber
INVENTOR.
BY *Clarence A. O'Brien*
and *Harvey B. Jacobson*
Attorneys

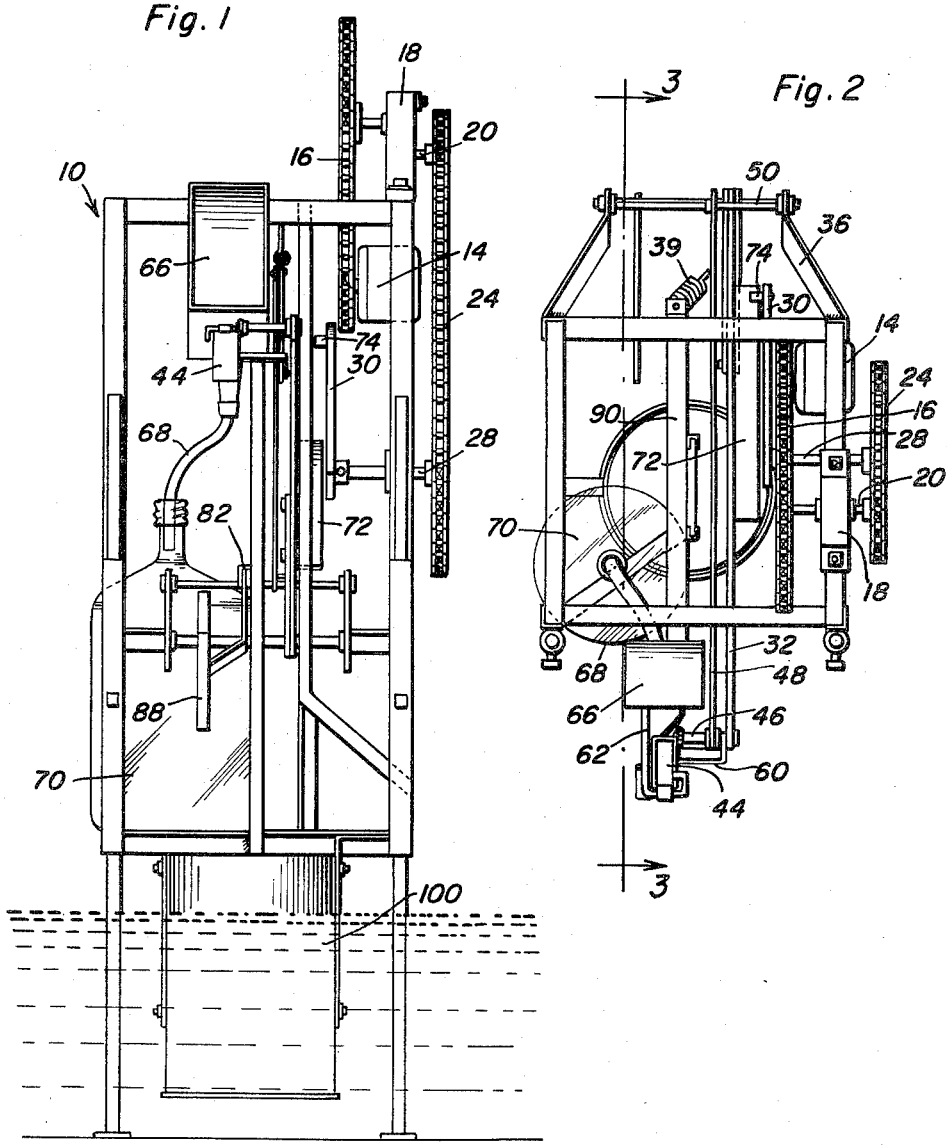
Oct. 4, 1960 — J. V. RICHGRUBER — 2,954,698
PORTABLE LIQUID SAMPLER AND FLOW RECORDER
Filed May 22, 1957 — 4 Sheets-Sheet 1
James V. Richgruber
INVENTOR.

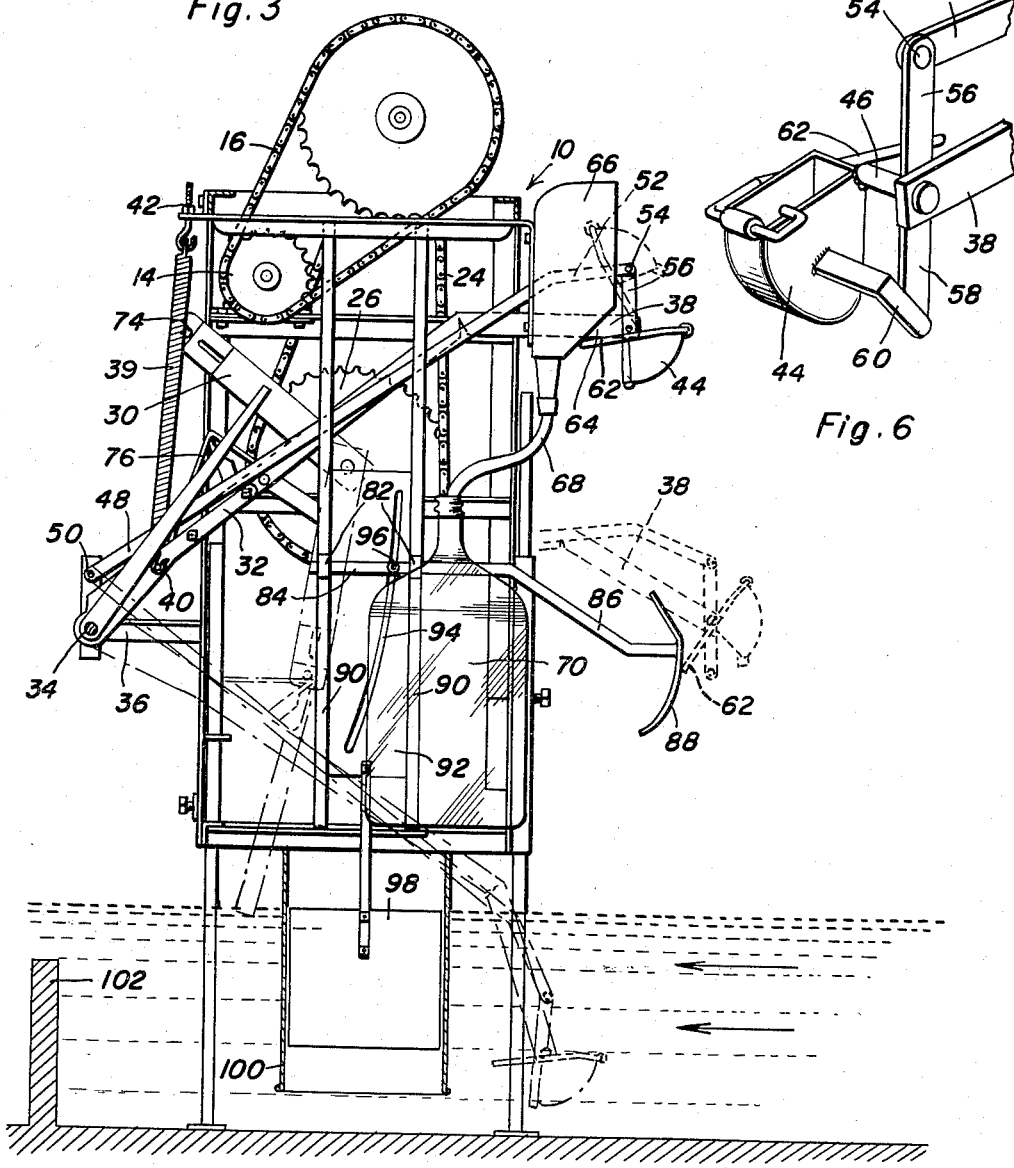
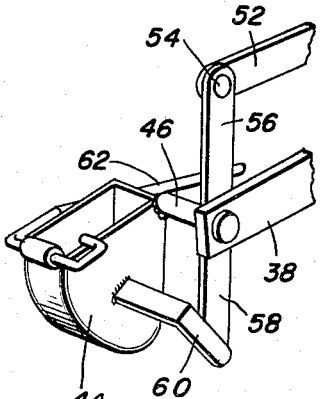

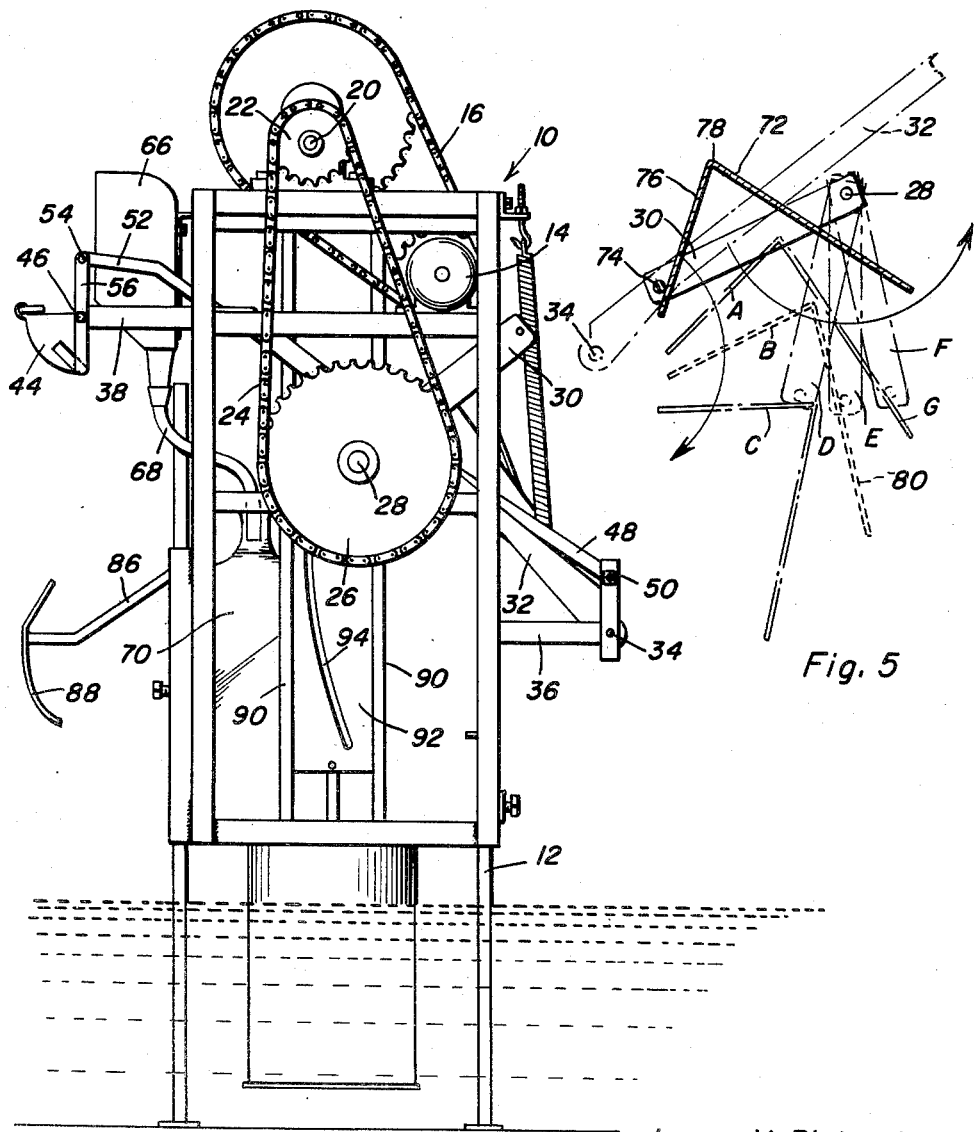

United States Patent Office 2,954,698
Patented Oct. 4, 1960

2,954,698

PORTABLE LIQUID SAMPLER AND FLOW RECORDER

James V. Richgruber, 508 Pearl St., Sparta, Wis.

Filed May 22, 1957, Ser. No. 660,843

14 Claims. (Cl. 73—423)

This invention comprises a novel and useful portable liquid sampler and flow recorder and more particularly relates to an automatic liquid sampling device which is adjustable as to the frequency and the quantity of the samples secured.

Federal, state and local health officials, as well as sanitary engineers, sewage plant operators and professional engineers frequently find it necessary to collect samples of sewage waste to determine its strength and volume. Such surveys are conducted primarily to determine the type and size of the sewage system required to treat these wastes or as a check on the sewage treatment facilities already provided.

In the collecting of such samples it is frequently desirable to obtain repeated samples over an interval of time in order to obtain an average result; and is often desired to obtain samples at different intervals which are adjustable and in different quantities which are variable in accordance with the particular conditions being tested.

It is accordingly the primary purpose of this invention to provide an automatic sampling and recording device which shall be sufficiently portable in nature to enable its ready transportation to a selected site for sampling and its removal therefrom.

A further object of the invention is to provide an apparatus in accordance with the preceding object which shall be automatic in its operation and shall be capable of being powered from various electric sources as electric supply lines, a storage battery, or a portable electric generator.

A still further object of the invention is to provide an apparatus in conformity with the above mentioned objects wherein the frequency of the obtaining of samples can be readily varied and regulated; and whereby the quantity of each sample is also subject to ready variation and control.

Yet another object of the invention is to provide an apparatus as set forth in the above mentioned objects in which the automatic operation of the apparatus may be regulated in accordance with predetermined datum.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the device in operative position for taking samples from a flowing stream;

Figure 2 is a top plan view of the arrangement of Figure 1;

Figure 3 is a vertical transverse sectional view taken substantially upon the plane indicated by the section line 3—3 of Figure 2, intermediate positions during the operation of the device being shown in dotted lines;

Figure 4 is an elevational view taken from the rear of Figure 3;

Figure 5 is a diagrammatic view illustrating the operation of the dipper arm of the apparatus;

Figure 6 is a perspective view of a portion of the dipper arm and dipper thereon;

Figure 7 is a perspective view of the apparatus showing a recorder attached thereto;

Figure 8 is a detailed view taken in vertical section substantially on the plane indicated by the section line 8—8 of Figure 7.

This invention employs a continuously rotating crank arm to intermittently depress a dipper arm whereby the dipper will be submerged in a stream, and thereafter will release the dipper arm and permit a spring to raise the selected sample. As the dipper arm is raised, the dipper strikes an adjustable abutment whereby a predetermined portion of its contents are discharged, thus retaining a sample of selected size. Upon the completion of an upstroke, this sample is dumped into a container for receiving the same. A float controlled mechanism responsive to the level of the stream being sample is utilized to adjust the dipper tipping mechanism, whereby the size of the sample will be proportionate to the liquid level in the stream, and by using an appropriate weir, the quantity of the sample obtained will be proportionate to the rate of flow of the stream.

Referring now specifically to the accompanying drawings it will be observed that the device consists of a tower-like supporting frame 10 of any desired construction, the same being carried by suitable adjustable supporting legs 12 whereby the device may be disposed in an erect position and at any desired elevation with respect to the surface of a stream or other flowing body of liquid to be sampled.

Mounted upon a suitable portion of the supporting framework 10 is an electric motor 14 comprising the source of power for the apparatus. This motor may be of a type capable of being run by storage batteries, commercial power lines or a portable generator or the like in order that the device may be adapted for use in all types of locations.

The motor 14 is connected as by a driving chain 16 with a gear reduction assembly indicated generally by the numeral 18 in Figure 1 and which may be of any desired construction, the gear reduction assembly through a power output shaft 20 in turn driving a shaft 22 which is connected by a driving chain 24 with a driven sprocket 26 on the shaft 28. This last mentioned shaft has a crank arm 30 secured thereto, which crank arm serves to impart intermittent reciprocation to the dipper in a manner to be now described.

A lever 32 is journaled as at 34 to support bracket assembly 36 carried by the framework and has an angularly disposed extremity 38. This lever constitutes the dipper arm of the apparatus and swings vertically between the full line position shown in Figure 3 to its lower position shown in dotted lines in Figure 3 submerged below the liquid to be sampled, and an intermediate position for discharging a part of its contents. A tension spring 39 has one end secured to the dipper arm as at 40 and its other end is adjustably mounted as at 42 to the framework, this spring tending to return the dipper arm to its raised position.

As shown in Figure 6, a bucket or dipper 44 is pivoted as at 46 to the extremity of the angulated portion 38 of the dipper arm for vertical swinging movement about a horizontal pivot pin. There is further provided a dipper levelling arm 48 having one end pivoted as at 50 to the above mentioned support bracket structure 36, the upper end of this levelling arm having an angulated end portion 52 which is pivoted at 54 to a link 56.

The link 56 is pivoted intermediate its ends to the pivot pin 46 previously mentioned, and has a downwardly projecting arm 58 adapted to abut against the handle 60 secured to the side of the dipper. It will be observed that the dipper arm 32, the dipper levelling arm 48, the support bracket assembly and the link 56 constitute a parallelogram so that the weight of the contents of the dipper 44 applied to its handle 60 against the end of the link at 58 will serve to maintain the dipper in horizontal position throughout its entire vertical swinging movement, except as the dipper is tilted about its pivot 46 by other means to be subsequently described.

Secured to the top of the dipper as shown in Figure 6 is a dumping handle 62 which is so positioned that when the dipper reaches its upward position this handle will strike a suitable abutment surface 64 beneath a hopper 66 and thus cause the dipper to pivot about its pivot pin 46 and dump its contents into the hopper 66. From the hopper the sample flows by conduit 68 to any suitable collecting means such as a container 70 where the accumulated samples are stored and subsequently moved for examination.

In order to transmit the continuous rotary motion of the motor, gearing assembly and crank arm 30 to intermittent vertical swinging movement of the dipper, the dipper arm is provided with an abutment or cam track 72 thereon (see Figure 5) which cam track is disposed in the path of travel of an actuating pin 74 carried by the crank arm 30. Referring especially to the diagrammatic view of Figure 5 it will be seen that the arrangement is such that as a crank arm revolves, its pin 74 will strike the upwardly inclined track portion 76 of the cam track 72. As the crank arm and its pin move downwardly, the cam track and consequently the dipper arm will be pivoted downwardly to the successive positions A, B and C, as the dipper arm 32 pivots downwardly about its pivot pin 34. During this downward pivoting of the cam track and dipper arm, the pin 74 will ride upward on the cam surface 76 until in the position C, it will be seen that this pin is preparing to ride over the angle or nose 78 of the cam track. At this point the position of the crank arm is shown at D. Upon further movement of the crank arm to the position shown at E, it will be seen that the crank pin has travelled across the nose and is now on the reversely inclined cam track portion 80, thus permitting the cam track arm to rise under the action of the return spring 39. At the position of the crank arm shown at F, it will be seen that the cam track has risen to the position shown at G, at which time the crank arm is preparing to disengage from the cam track and permit the dipper arm to thus be returned to its upward position and limit of travel.

It will thus be apparent that during each revolution of the crank arm, the dipper arm is forced downwardly to cause the same to emerse the dipper into the liquid to be sampled, as shown in the lowest dotted line position of Figure 3; and thereafter the dipper arm is permitted to rise until eventually the top position is reached at which time the dipper automatically discharges its contents.

In some instances, where it is desired to secure as the sample the full contents of the dipper without variation, the mechanism as so far described will be satisfactory. In most instances, however, it is preferred to cause the dipper to automatically discharge a part of its contents and leave a predetermined exact measured sample in the dipper. For that purpose, a dipper tilting means is provided intermediate the lowermost and the uppermost positions of the dipper arm and dipper.

Horizontally slidable in suitable guide brackets 82 carried by the supporting frame is the horizontally extending extremity 84 of a bar having an angulated outer extremity 86 having a cam plate 88 thereon. This plate 88 is so positioned that when it is disposed in the path of travel of the ascending dipper, the handle 62 of the dipper will ride upon the cam plate 88 and thus tilt the dipper to cause the same to spill or pour out a part of its contents. As will be apparent, the cam plate 88 is provided with the desired contour so as to tilt the dipper to the desired extent for a sufficient length of time to discharge all but a predetermined portion of its contents.

As will be readily apparent, the extent to which the cam plate 88 is moved into the path of travel of the dipper will determine the proportion of the contents of the dipper which are to be discharged. In some instances, it may be desired to manually adjust and position the cam plate in its guide bearings 82. However, the invention also contemplates an automatic means for automatically adjusting the amount of projection of the cam plate into the path of travel of the dipper and thus variably control the quantity of sample to be retained in the dipper.

As shown best in Figures 2, 3 and 4, there is mounted upon the framework a pair of vertical laterally spaced channel members 90 which constitute vertical guide ways in which is slidably received a cam plate 92 for vertical sliding movement. The control plate is provided with a cam slot 94 having a predetermined contour in accordance with the flow rates of the stream to be sampled at the like. The bar 84 of the cam plate 88 is provided with a cam follower or pin 96 which rides in the cam slot 94 so that upon vertical travel of the plate 92, the horizontal shifting will be imparted to the bar 84 and to the cam plate 88.

At it slower end, the plate 92 is suitably secured to a float 98 which is freely slidable in a guide cylinder 100 suitably mounted upon the supporting framework. Thus, as the float rises and falls in accordance with the level of the liquid being sampled, a corresponding shifting of the cam plate 80 will be effected. It will be understood that by applying a suitable weir plate 102 downstream of the device, that the velocity of flow will be built into a variation in the level of the liquid, which in turn is utilized to adjust the cam plate 92 and thus the abutment or cam plate 88.

As an example of the manner in which the cam plate 92 and its cam slot 94 will be calibrated, it is observed that in response to any variations in the elevation of the flow over the weir, the float 98 will rise or fall accordingly, thereby raising or lowering the cam plate 92. The slot 94 will have its vertical length determined by the maximum operating range of the weir to be used and thus the amount of rise and fall of the float. The horizontal travel of the slot of course effects the horizontal shifting of the bar 84 and the cam plate 88. The contour of the cam slot is thus designed to coincide with the flow rate curve for the particular weir being used, and therefore by varying the proximity of the cam plate 88 with respect to the handle 62 of the dipper during the lifting movement of the latter, it is obvious that any desired portion of the sample may be discharged and any desired amount retained in the dipper after passing the cam plate 88. It will be observed that the dipper levelling arm maintains the dipper level at all times except when the dipper is tilted away from its abutting engagement with the levelling arm by engagement of a handle 62 with the cam plate 88 or by engagement with the surface 64 of the hopper 66.

Reference is now made to Figures 7 and 8 for an explanation of a recording device which may be used in conjunction with the sampling device. Here a suitable supporting framework 150 is provided having a pair of tracks 152 in which a cam plate 154 is vertically slidable by means of a cable 156 passing across a pair of support pulleys 158 and 160 journaled upon a supporting bracket 162. The other end of the cable is attached to the previously mentioned cam plate 92 so that as the plate 92 rises and falls, the cam plate 154 is likewise caused to move vertically. Journalled in the supporting frame is a transverse shaft 164 having a crank arm 166 provided with a pin 168 whose travel in the cam slot 170 of the cam plate 154. Thus, in accordance with the contour of the cam groove 170, a rocking motion is imparted to the shaft 164. The latter in turn carries an arm 172 with a stylus or pin 174 engaging a graph surface 176 driven by suitable clock-work mechanism indicated generally at 178.

It will be observed that the cam plate 154 may be calibrated in gallons per minute and may thus afford a visual record of variations at the rate of flow past the device for a given period of time.

It will generally be preferred to have the tilting of the dipper by the cam plate 88 timed to occur while the crank pin 74 is still engaged with the cam track portion 80, in order that the rate of ascent of the dipper arm will be controlled to effect sufficient time for the discharging operation of a portion of the dipper contents.

The frame 150 may of course constitute the frame 10 primarily described or may be a separate frame if desired.

What is claimed as new is as follows:

1. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means connected to said dipper arm and yieldingly opposing operation of said first mentioned means for lifting said dipper arm and dipper to a raised dumping position, means for tilting said dipper for discharging its sample when in the raised position, means for collecting samples discharged by the dipper in its raised position, means responsive to the rate of flow of a liquid being sampled for tipping the dipper for discharging an adjustable portion of its contents during its upward travel.

2. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means connected to said dipper arm and yieldingly opposing operation of said first mentioned means for lifting said dipper arm and dipper to a raised dumping position, means for tilting said dipper for discharging its sample when in the raised position, means for collecting samples discharged by the dipper in its raised position, means responsive to the rate of flow of a liquid being sampled for tipping the dipper for discharging an adjustable portion of its contents during its upward travel, said tipping means including a cam surface disposed in the path of travel of the dipper and engageable with the dipper for tilting the latter.

3. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means connected to said dipper arm and yieldingly opposing operation of said first mentioned means for lifting said dipper arm and dipper to a raised dumping position, means for tilting said dipper for discharging its sample when in the raised position, means for collecting samples discharged by the dipper in its raised position, means responsive to the rate of flow of a liquid being sampled for tipping the dipper for discharging an adjustable portion of its contents during its upward travel, said tipping means including a cam surface disposed in the path of travel of the dipper and engageable with the dipper for tilting the latter, said cam surface having mounting means supporting it for horizontal travel towards and from the path of vertical movement of the dipper.

4. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means lifting said dipper arm and dipper to a raised dumping position, means for tilting said dipper for discharging its sample when in the raised position, means for collecting samples discharged by the dipper in its raised position, means tipping the dipper for discharging a portion of its contents during its upward travel, said tipping means including a cam surface disposed in the path of travel of the dipper and engageable with the dipper for tilting the latter, said cam surface having mounting means supporting it for horizontal travel towards and from the path of vertical movement of the dipper, means responsive to flow of the liquid being sampled for adjusting said mounting means.

5. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means lifting said dipper arm and dipper to a raised dumping position, means for tilting said dipper for discharging its sample when in the raised position, means for collecting samples discharged by the dipper in its raised position, means tipping the dipper for discharging a portion of its contents during its upward travel, said tipping means including a cam surface disposed in the path of travel of the dipper and engageable with the dipper for tilting the latter, said cam surface having mounting means supporting it for horizontal travel towards and from the path of vertical movement of the dipper, means responsive to flow of the liquid being sampled for adjusting said mounting means, said flow responsive means comprising a float adapted for vertical movement in the liquid, a cam plate secured to said float and mounted for vertical movement, means connecting said mounting means to said cam plate.

6. The combination of claim 5 wherein said connecting means comprises a cam slot in said cam plate, a pin carried by said mounting means engaged in said cam slot.

7. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means lifting said dipper arm and dipper to a raised dumping position, means for tilting said dipper for discharging its sample when in the raised position, means for collecting samples discharged by the dipper in its raised position, said dipper arm moving means including a cam track thereon, a continuously revolving crank arm intermittently engaging said track for intermittently depressing said dipper arm.

8. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means lifting said dipper arm and dipper to a raised dumping position, means for tilting said dipper for discharging its sample when in the raised position, means for collecting samples discharged by the dipper in its raised position, a dipper levelling arm pivoted to said frame and connected to said dipper for normally maintaining the latter level during its vertical travel.

9. An automatic liquid sampling device comprising a supporting frame, a dipper arm pivoted upon said frame for vertical swinging about a horizontal axis, a dipper pivotally mounted on said dipper arm, means for periodically moving said dipper arm and dipper downwardly to a loading position, spring means lifting said dipper arm and dipper to a raised dumping position, means for tilting said dipper for discharging its sample when in the raised position, means for collecting samples discharged by the dipper in its raised position, means responsive to the rate of flow of a liquid being sampled for tipping the dipper for discharging an adjustable portion of its contents during its upward travel, a recording means operatively connected to said dipper tipping means.

10. An automatic liquid sampling device comprising a supporting frame, a dipper supported upon said frame for vertical travel between a lower sample receiving position and an upper sample discharging position, means for periodically moving said dipper between said positions, means for discharging the samples from the dipper when the latter is in its upper position, means for collecting the samples discharged in said upper position, means mounted on said frame and cooperating with said dipper for discharging therefrom a portion of the sample therein during movement of the dipper from the lower to the upper position, means adjusting said last mentioned means to vary said portion of the sample discharged whereby adjustably controlled portions of the samples received in the lower position would be discharged from the dipper in its upper position.

11. An automatic sampling device for flowing liquids comprising a dipper, means supporting said dipper for vertical travel between a lower position for receiving samples from a flowing liquid and an upper position for discharging said samples, means for collecting samples discharged from said dipper at said upper position, means for removing a portion of the sample in said dipper during the travel of the latter from its lower to its upper position, means responsive to variations in the flow of said flowing liquid for adjusting said removing means whereby to adjust the quantity of the sample remaining in said dipper and which is subsequently discharged at said upper position.

12. The combination of claim 10, including pivot means upon which said dipper is mounted for tilting about a horizontal axis during its vertical travel, said means for removing including an actuating member located between said upper and lower positions and engaged by a portion of said dipper during the upward travel of the latter for tilting said dipper.

13. The combination of claim 11, including pivot means upon which said dipper is mounted for tilting about a horizontal axis during its vertical travel, said means for removing including an actuating member located between said upper and lower positions and engaged by a portion of said dipper during the upward travel of the latter for tilting said dipper.

14. The combination of claim 11, including pivot means upon which said dipper is mounted for tilting about a horizontal axis during its vertical travel, said means for removing including an actuating member located between said upper and lower positions and engaged by a portion of said dipper during the upward travel of the latter for tilting said dipper, means mounting said actuating member for horizontal sliding movement along a path intersecting that of the vertical path of travel of said dipper, said flow variation responsive means being connected to said actuating member for slidably moving the latter towards and from said vertical path of travel of said dipper whereby to vary the amplitude of the tilting action imparted thereby to the latter.

References Cited in the file of this patent

UNITED STATES PATENTS

| | | |
|---|---|---|
| 1,063,494 | Bardill | June 3, 1913 |
| 1,283,022 | Arden | Oct. 29, 1918 |
| 1,843,552 | Gibson et al. | Feb. 2, 1932 |
| 1,874,395 | Watts | Aug. 30, 1932 |
| 2,234,599 | Johnston | Mar. 11, 1941 |
| 2,774,496 | Dorkins | Dec. 18, 1956 |